March 4, 1941.                G. CAROLIN                  2,234,075
                               MEMORIZER
                          Filed Feb. 16, 1940          2 Sheets-Sheet 1
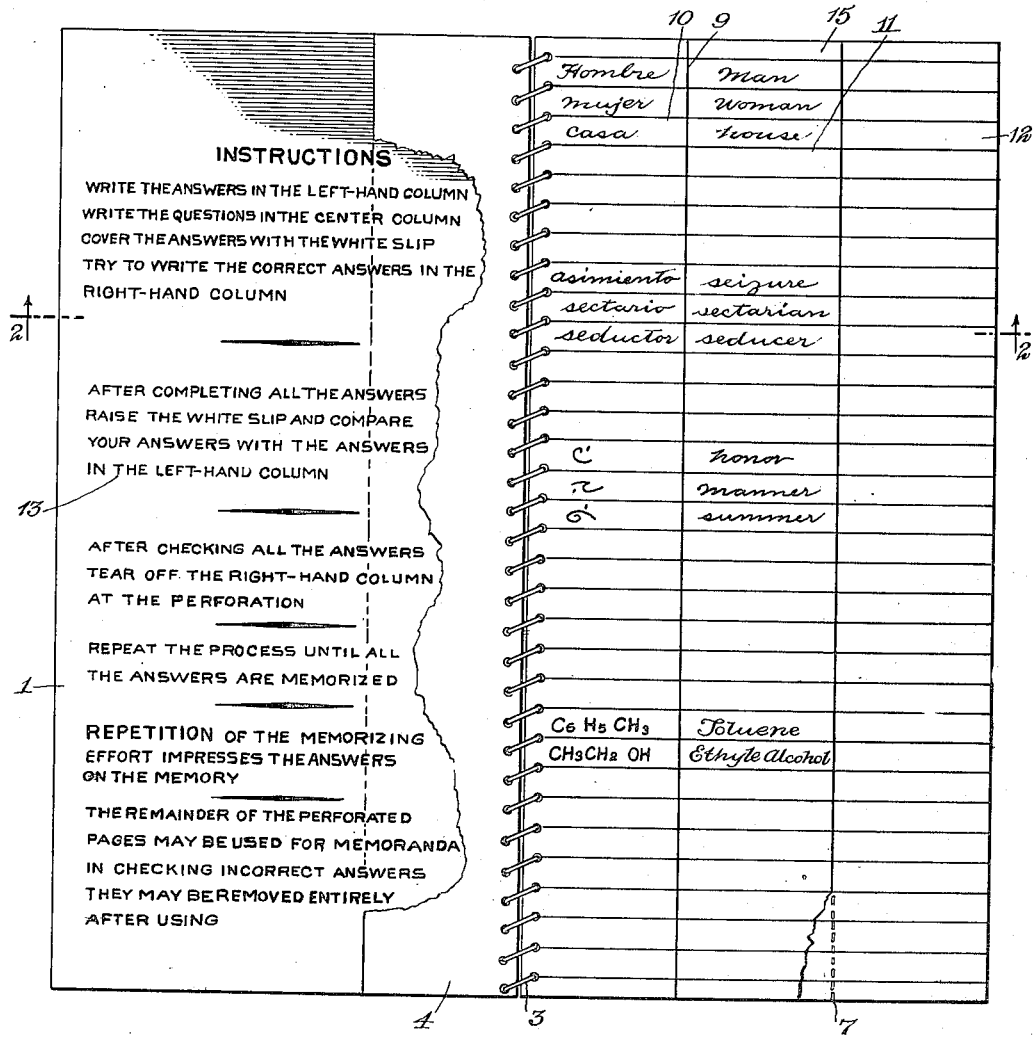
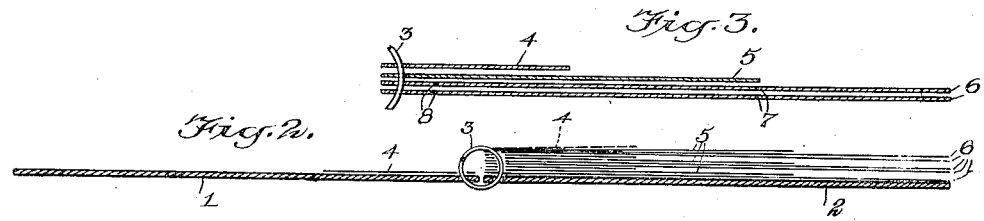
WITNESSES                                    INVENTOR
                                              Guy Carolin
                                        BY
                                                   ATTORNEYS March 4, 1941.   G. CAROLIN   2,234,075
MEMORIZER
Filed Feb. 16, 1940   2 Sheets-Sheet 2
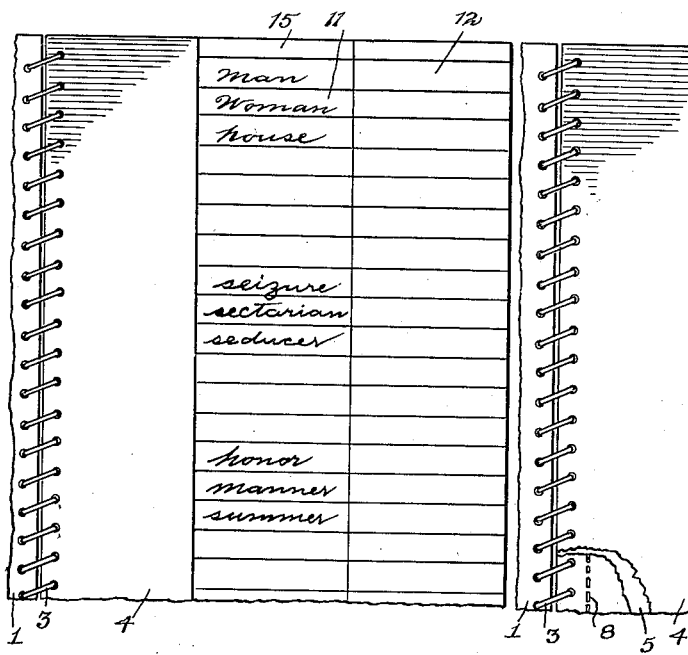
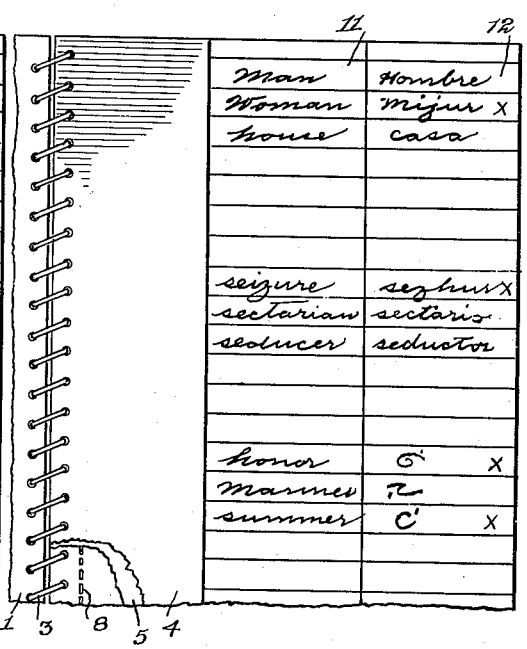
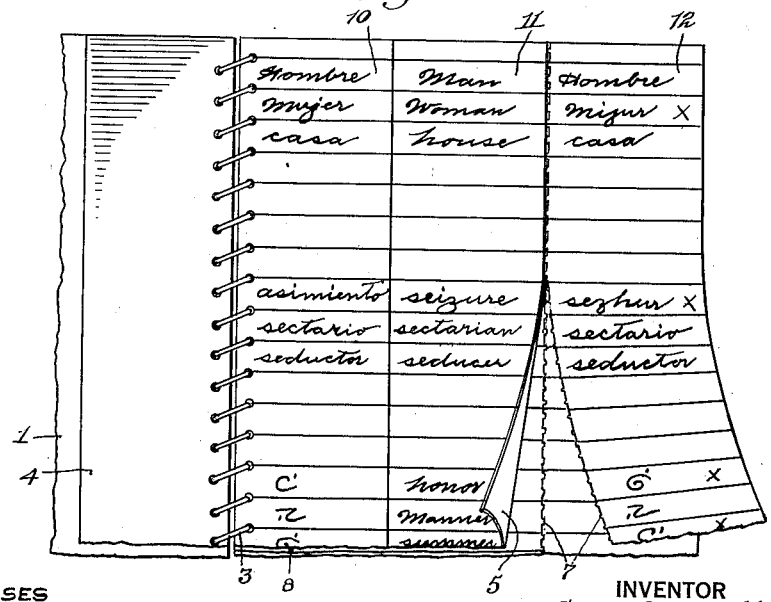
WITNESSES
INVENTOR
Guy Carolin
BY
ATTORNEYS Patented Mar. 4, 1941

2,234,075

UNITED STATES PATENT OFFICE 2,234,075

MEMORIZER

Guy Carolin, New York, N. Y.

Application February 16, 1940, Serial No. 319,231

4 Claims. (Cl. 35—22)

This invention relates to an educational device for aiding in learning. More particularly, the invention relates to a device for displaying problems and answer items to be learned respectively in juxtaposition where they can be studied and visually associated, and for hiding at will said answer items while they are written down for practice and testing using the problem to suggest the items to be written.

It is an object of the invention to provide a structure which lends itself to the particular needs of each student in any particular study, with which the student can with a minimum of effort prepare his own study text of items which he has particular need to learn, and with which he can rehearse and test his learning.

A further object of the invention is to provide an inexpensive structure which may be of size and form convenient for carrying in pocket or handbag with which a student can study, rehearse or test his lesson and learning whenever and wherever he may have a moment to spare.

In the accompanying drawings—

Fig. 1 is a plan view of a memorizer disclosing an embodiment of the invention, the memorizer being shown open and ready for use;

Fig. 2 is a sectional view through Fig. 1 on the line 2—2;

Fig. 3 is an enlarged fragmentary view similar to the upper part of the right-hand portion of Fig. 2;

Fig. 4 is a fragmentary view showing the right-hand upper part of the structure shown in Fig. 1, the cover leaf being closed or in functioning position;

Fig. 5 is a view similar to Fig. 4 but showing the work of the student in the last column;

Fig. 6 is a view similar to Fig. 5 but showing the last column being torn off.

Referring to the accompanying drawings by numerals, 1 indicates the front of the device and 2 the back, which are connected by a connector or binder 3. The front and back may be perforated to receive the connector or binder 3 and the various leaves hereinafter described may also be perforated so that the entire structure, in a broad sense, presents a loose-leaf book or it may be bound or fastened in any other way.

As shown particularly in Fig. 2, means have been provided for presenting a plurality of lessons, which lessons may be different subject matter or the same subject matter. As indicated in Fig. 3, 4 indicates a cover or mask sheet, for instance for the first lesson, and 5 a problem and answer sheet coacting with the cover sheet 4. Associated with the problem and answer sheet 5 are a number of work sheets 6. Only two of these work sheets 6 are shown in Fig. 3 but it will be evident that many more may be used if desired. The work sheets 6 are full-width sheets while the instruction sheets 5 are approximately two-thirds width and the cover sheets 4 are approximately one-third width. As shown in Fig. 2, a plurality of groups of sheets as shown in Fig. 3 are provided. The various work sheets 6 are each provided with a row of perforations 7 and a second row of perforations 8. When the book is opened to the first lesson it will appear as shown in Fig. 1. The various sheets may or may not be provided with coinciding horizontal lines as shown in the drawings.

The instruction sheet 5 is divided by a line into columns 10 and 11. As the instruction sheet 5 overlaps two-thirds of the work sheet 6, there will be left exposed to view a single column 12 on each work sheet. Column 10 carries certain information, as for instance, the correct answers to different questions. Column 11 carries problems, e. g., words or signs which call for the correct answers shown in column 10. For instance, at the upper part of column 10, certain nouns have been written in Spanish and in column 11 the same nouns have been written in English. This idea is carried out throughout the columns for the various information to be studied. If some Spanish speaking person intends to study English, column 10 would contain English words, signs, or other problems, and column 11 would have the corresponding Spanish words.

After the student has attempted to memorize the answers contained in column 10, he swings the cover leaf 4 over to the position shown in Fig. 4 and then writes the answers in column 12 from memory. As shown in Fig. 5, the words "man," "woman" and "house" are written in English in column 11 and the student writes these same words in Spanish in column 12. The other matter is also written in column 12 by the student. As indicated in the lower part of Fig. 5, the student has incorrectly spelled the word "seizure" in Spanish, and also two of the shorthand notes have been incorrectly placed. The student writes all the matter in column 12 from memory, and in order to check the accuracy thereof he swings the cover sheet back to the position shown in Figs. 1 and 6. This exposes the column 10 and the student may readily check off his answers and concentrate his further study on those items where he has erred. As illustrated in Fig. 5, three of the answers are incorrect. The student then tears off column 12 from the uppermost work sheet 6. This discloses column 12 on the next work sheet.

After the student has memorized the correct answers to the three questions that were wrong he again writes from memory all the answers in column 12, or if he prefers, only those which were wrong. Before writing the answers the student will, of course, swing cover sheet 4 over to the position shown in Figs. 4 and 5. Whenever the student is writing in column 12, the cover sheet 4 is always functioning to cover column 10. By repeating this process several times the correct answers are memorized.

By systematic repetition memorizing is obtained, namely, the retention in the memory of the correct answers. This structure may be used in the study of various types of problems, e. g., foreign languages, stenography, chemistry, or other studies where a certain amount of memorization is essential, and in general in any learning where a particular answer is called for in response to a brief problem.

After the work sheet 6 has been used it may be torn away along the perforated line 8; the perforations being thus provided in my preferred embodiment in order to substantially equalize the thickness of the book throughout its width and prevent unequal thickness caused by tearing off column 12 from a number of the work sheets.

It will be understood that when the book as shown in Fig. 2 is first purchased it will have instructions 13 on the inside surface of the front 1 and the various sheets 4, 5 and 6 will be blank, or the book may be supplied with printed question and answer material in columns 10 and 11.

In using the device in blank form the student will copy in column 10 the matter to be studied and will also copy the matter in column 11. If it should be desired to study Spanish, column 10 would be supplied with Spanish words and column 11 supplied with English words corresponding to the words in Spanish. All these words would be copied from an original Spanish instruction book and placed on the instruction sheet by the student. After the two columns have been filled with the desired words, cover sheet 4 is moved to the position shown in Fig. 5 and then the student writes in column 12 the Spanish words for the words found in column 11. In this way the student will have the experience of writing both the Spanish and the English words, and in that way fix them in his mind. Any words he incorrectly writes in column 12 after repeating this process several times, may be transferred to another lesson to be further memorized and tested. The student may fill in the questions and answers on only one section of the book at one time or may fill in the entire book and memorize as many items at one time as he may desire. The book may be printed or otherwise supplied with material in the answer column 10 and the question column 11 to supply the student with study material instead of these columns being blank as in the drawings, but it is to be understood that the words, formulas, etc., which have been shown filled in, in Figure 1, are merely intended to show by example how the invention is used, and that any such words, etc., do not constitute part of the actual structure of the invention.

An aid to memorizing as described and shown in the accompanying drawings requires a certain amount of systematic repetition by the student and this assists in fixing the correct answers in the student's mind.

I claim:

1. A practice and testing book which comprises a binding, a sheet having lines transverse to the binding and lines parallel to the binding and intersecting said first-mentioned lines for defining two columns of rows of spaces adapted for inscriptions respectively of problems and answers, and a mask sheet bound with said first-named sheets, and aligned with the columns and adapted to cover the column nearest the binding, and one or more sheets bearing lines in alignment with the transverse lines of the first sheets and defining spaces adapted to receive written answers, said last-named sheets extending beyond the edge of the first-named sheets which is parallel to the binding, whereby said last written answers may be composed with said first answers.

2. A practice and testing book as defined in claim 1, in which there is more than one sheet adapted to receive the written answers associated with each of the first-named sheets, and each of said sheets adapted to receive the written answers is perforated along a line between the portions thereof extended for the written answers and the edges of said sheets adjacent to the binding, whereby at least said extended part providing the spaces for the written answers may be removed.

3. A practice and testing book as defined in claim 1, in which there is more than one sheet adapted to receive the written answers associated with the first-named sheet, and each of said sheets adapted to receive the written answers is perforated along a line coinciding with the edge of said first-named sheet.

4. A practice and testing book which comprises a binding, a sheet having lines defining rows of spaces extending across columns, each column adapted for inscription of problems and answers respectively, and a mask sheet bound with said first-named sheets and aligned with and adapted to cover one of the columns of said first-named sheet, and one or more sheets having a column of rows of spaces aligned with and adjacent to corresponding spaces of one of the columns of the first-named sheet, and adapted to receive written answers, said column of spaces on the last-named sheets extending beyond the edge of the first-named sheets, whereby said last written answers may be compared with the first answers.

GUY CAROLIN.